United States Patent [19]

Herzog

[11] Patent Number: 4,587,622
[45] Date of Patent: May 6, 1986

[54] METHOD AND APPARATUS FOR DETERMINING AND CORRECTING GUIDANCE ERRORS

[75] Inventor: Klaus Herzog, Oberkochen, Fed. Rep. of Germany

[73] Assignee: Carl-Zeiss-Stiftung, Heidenheim/Brenz, Oberkochen, Fed. Rep. of Germany

[21] Appl. No.: 446,163

[22] Filed: Dec. 1, 1982

[30] Foreign Application Priority Data

Dec. 23, 1981 [DE] Fed. Rep. of Germany ....... 3150977

[51] Int. Cl.⁴ .................. G05B 19/18; G01B 11/26
[52] U.S. Cl. .................................. 364/561; 318/569; 356/152; 364/170; 364/474; 364/571
[58] Field of Search ............. 364/142, 167, 170, 474, 364/513, 561, 571; 340/825.23; 318/568, 569, 572; 356/138, 152

[56] References Cited

U.S. PATENT DOCUMENTS

| | | | |
|---|---|---|---|
| 3,182,375 | 5/1965 | Hoffrogge | 29/1 R |
| 3,546,671 | 12/1970 | Rogert et al. | 364/561 X |
| 3,694,089 | 9/1972 | Rantsch | 356/138 |
| 3,749,501 | 7/1973 | Wieg | 250/237 G |
| 3,831,283 | 8/1974 | Pagella et al. | 33/559 |
| 4,047,025 | 9/1977 | Lemelson | 318/569 X |
| 4,362,977 | 12/1982 | Evans et al. | 364/513 X |
| 4,370,721 | 1/1983 | Berenberg et al. | 364/474 |
| 4,481,592 | 11/1984 | Jacobs et al. | 364/513 |

FOREIGN PATENT DOCUMENTS 1541731 3/1979 United Kingdom .

Primary Examiner—Errol A. Krass
Assistant Examiner—Kevin J. Teska
Attorney, Agent, or Firm—Hopgood, Calimafde, Kalil, Blaustein & Judlowe

[57] ABSTRACT

Two methods are disclosed for eliminating the influence of guidance errors on the precision of determining the position of guided machine parts as in a coordinate-measuring machine, whereby the resulting measurement may be provided with a correction which is dependent on the guidance error. In a first method of the invention, the relevant guidance errors of the machine are determined and approximated by correction functions which are stored in the computer of the machine; the stored correction functions are used for automatic correction of errors otherwise inherent in operation of the coordinate-measuring machine. In a second method of the invention, additional measuring devices are mounted to displaceable parts of the machine, and these devices respond to changes in offset distance from reference surfaces arranged parallel to applicable coordinate guides; these measurement devices provide continuous detection of guidance errors, throughout the measurement process.

15 Claims, 11 Drawing Figures

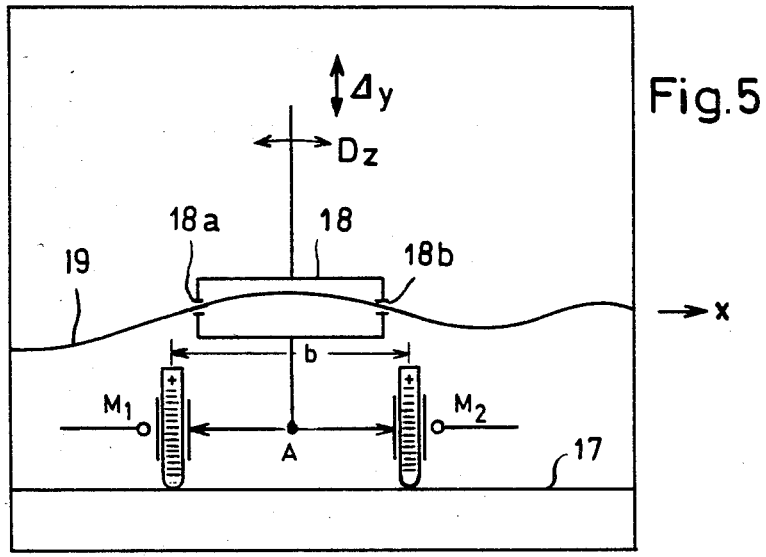
Fig.5
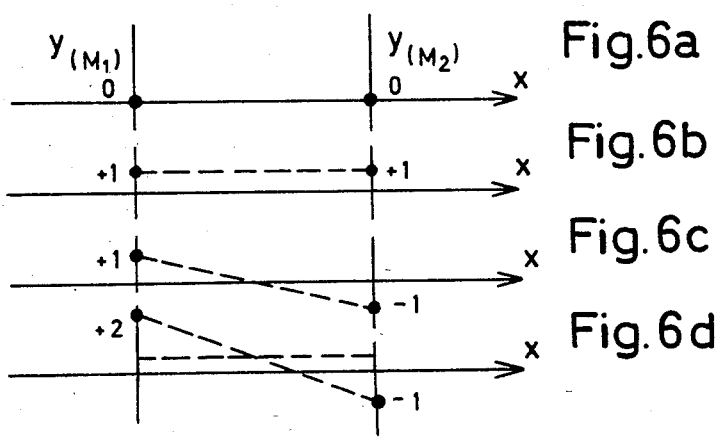
Fig.6a
Fig.6b
Fig.6c
Fig.6d

METHOD AND APPARATUS FOR DETERMINING AND CORRECTING GUIDANCE ERRORS

BACKGROUND OF THE INVENTION

The present invention relates to a method of determining guidance errors and compensating for their influence on the precision of positional determination of a guided component of a machine, such as a multiple-coordinate measuring machine.

In principle, various guidance errors can occur for a guided part, in relation to a single guide therefor, namely three angular displacements of the guided part, about an axis parallel to the guide and about each of the two axes perpendicular thereto, as well as linear offset of the guided part in the respective directions of the two last-mentioned orthogonal axes. Furthermore, the scale used for positional determination of the guided part in the direction of guidance can have errors in graduation.

These guidance errors can be reached to two classes: The first class comprises so-called long-period guidance errors which are due primarily to deviations in planarity of involved guidance surfaces and to deformations of the guidance elements (bearing + guide) as a result of changes in load. The second class comprises short-period guidance errors which, as a rule, do not exhibit reproducible behavior. The two types of errors affect the precision of positional determination to different extents, depending on the construction of the guide. For example, the short-period error is negligible for air-mounted guidance systems; but in systems which rely on anti-friction bearings, the bearings can make a substantial contribution to the total error.

To compensate for the influence of guidance errors one can, in principle, proceed along two different courses: either one compensates for the guidance errors themselves, or one detects them and corrects the result of the measurement for the applicable position position of the guided part.

The first possibility is utilized in West German Auslegeschrift AS 2,231,644, West German Auslegeschrift AS 1,157,877, West German Pat. No. 1,915,940 and West German Offenlegungsschrift OS 2,647,147. These solutions however, require a large mechanical expenditure since precise correction movements are imposed upon guide elements which are subjected to rather considerable loads.

West German Pat. No. 1,638,032 discloses an automatic program control in which the measured coordinate values of the guided part are provided with a position-dependent correction. Error values used for the correction are determined by the actual measurement process and are stored in tabulated form in a computer. Then, the stored values are used to modify the control commands of the program by which the guided part is automatically positioned.

Such program control requires relatively great electronic expense, since a multi-dimensional data field for the correction must be stored, to serve positioning in each of several coordinates. Since control commands for the machine are derived from the stored correction values, speed of machine operation is dependent on the speed of computation.

The second method (correction of the measurement result) is used in devices described in West German Pat. No. 1,964,470 and in West German Auslegeschrift AS 2,248,194.

In West German Pat. No. 1,964,470, all displacement axes of a machine are provided with afocal optical systems to detect the guidance errors. Each of these optical systems images two pairs of marks or scales on the other. But each afocal optical imaging system requires a relatively large aperture in order to obtain sufficiently high resolution. Thus, to employ such optical systems is not only expensive and uneconomical, but also considerably increases the dimensions of the machine in question, and such increases are generally undesired.

West German Auslegeschrift AS 2,248,194 describes a portal-type measurement machine which is provided with two scales measuring in the direction of portal displacement, one scale for each of the two columns of the portal. In this way, only angular displacement of the portal about the vertical is detected, and there is no detection of lateral offset, i.e., offset perpendicular to guidance direction. Furthermore, machine cost may be increased by the additional scale.

BRIEF STATEMENT OF THE INVENTION

The object of the present invention is to provide a method of detecting guidance errors and of correcting for their influence on the positional determination of a guided part, which method requires comparatively little manufacturing expense and is particularly suited for use in coordinate-machines.

The invention achieves this object in a first manner through calculation of an approximation function from measured error values, the approximation function being stored in an electronic computer and permanently available for correction of values measured by a measurement device which is served by the guided part and coupled to the computer. Thus-corrected measured values are then fed to a display or recording unit.

Guidance-dependent positional errrs, for example of the work-contact probe head of a measurement machine, may thus as a rule be determined once and for all after final set up of the machine, as, for example, by moving the measurement probe of the machine along a position standard which extends over substantially the entire measurement range, and performing this operation of each of the coordinate axes. From deviations found between measured values and desired values, an approximation function is then calculated which requires scarcely any space in memory and is available for connection of measured values, in the course of each measurement process. In this connection, it may be advisable to redetermine the correction function repeatedly, at relatively long intervals of time, in order to be able to correct for guidance errors which may result from wear.

The indicated method is particularly suitable for correcting the influence of long-period guidance errors, and it has the advantage that an error in the scale graduation which measures in the guidance direction can also be taken into consideration. Another advantage of the method is that it can be performed without having to act on or make structural changes in the corresponding machine control. Of course, the correction of each measured value requires a certain computation time; as a rule, however, this does not have any effect on the operating speed of the machine.

The speed of operation of a measuring machine is determined less by the process of actually obtaining the measured value than by the time which is required for reaching the successive points to be measured. With proper organization of the computer program used for evaluation, point-to-point travel time can be utilized for application of correction value to each measurement result that has most recently been computed.

On the other hand, it is not necessary to effect all conceivable corrections. For example, in the case of a measurement machine of portal configuration, it will be of less interest to correct for angular displacements of the portal about its axis of guidance since the large base afforded by the portal materially reduces their significance. On the other hand, it is necessary to be concerned with angular displacement about the vertical since the precision of measurement is more adversely affected by the involved smaller base and by the lever-arm step-up attributable to the width of the portal.

A second method to achieve the stated object of the invention is characterized by using at least two additional measuring devices in determining the guidance errors. These additional measuring devices aremounted to the part which is displaceable along the involved guide, and involved guide, and they respectively measure their lateral-offset distance form reference lines extending in the direction of guided displacement; output signals of the additional measurement devices are combined with output signals of the coordinate measurement devices, to correct for the guidance errors.

In this second method, relevant guidance errors are determined continuously, i.e., by two or more additional measuring devices for each measurement. The advantage of this solution is sthat short-period guidance errors ca be determined even though they may not exhibit reproducible behavior. The structural expense for carrying out the method is comparatively slight since, for example, only one additional probe of conventional construction is required for each guidance error to be detected, and there is no complete length-measuring system, such as that in the measurement machine of West German Auslegeschrift AS No. 2,248,194.

In this connection, it is by no means necessary to develop the reference lines themselves to highly precise linearity standards. Rather, it may be advisable to use reference lines which can be produced much less expensively and to store the deviations, once determined by measurement against a linearity standard, in the form of an approximation function, for permanent use in the correction of values measured by the additional measurement devices. Such a correction technique will be seen to proceed from a combination of the two methods outlined above, and to achieve maximum precision of machine operation, at relatively little expense, since machine-guidance surfaces, which accommodate the sliding engagement of the additional probes, can be used, for example, as reference lines.

DETAILED DESCRIPTION

The invention will be described in further detail in conjunction with the accompanying drawings, in which:

FIG. 5 is a diagram schematically showing another embodiment of a device for detecting guidance errors;

FIGS. 6a to 6d are diagrams to illustrate four possible measured-value combinations of error-sensitive probes in the embodiment of FIG. 5;

Figure 1:
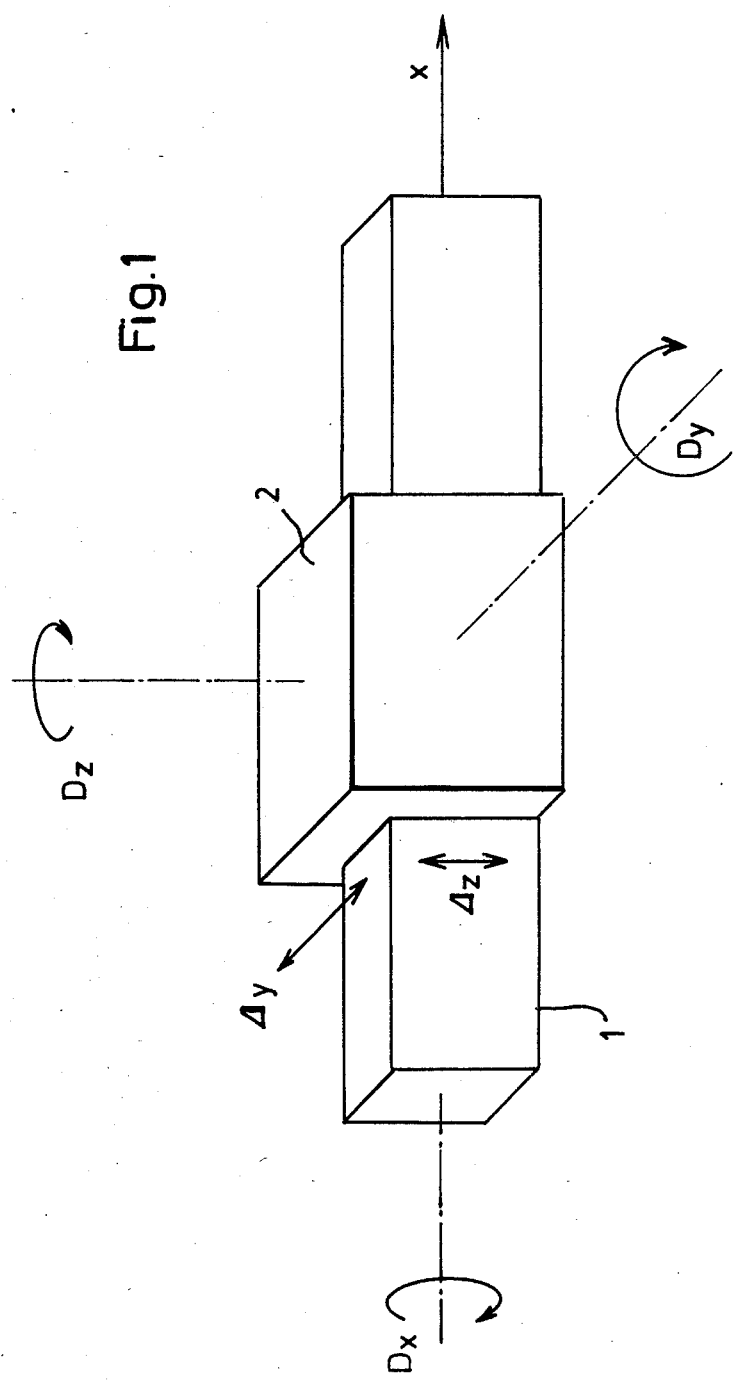
FIG. 1 is a simple isometric diagram to illustrate sources of error in a longitudinal guide.

FIG. 1 serves to illustrate a slide part 2 that is displaceable along an x-direction guide part 1, together with an indication of the five guidance errors to which part 2 may be subject, by reason of such displacement. part 2 may be subject, by reason of such displacement. These guidance errors are:
1. Lateral offset: $\Delta_y$
2. Vertical offset: $\Delta_z$
3. Rotation about the longitudinal axis of the guide: $D_x$
4. Rotation about the vertical: $D_z$
5. Rotation about the y-axis: $D_y$ All of these guidance errors affect the position of the guided part 2 as a function of its location in the x-direction.

Figure 2:
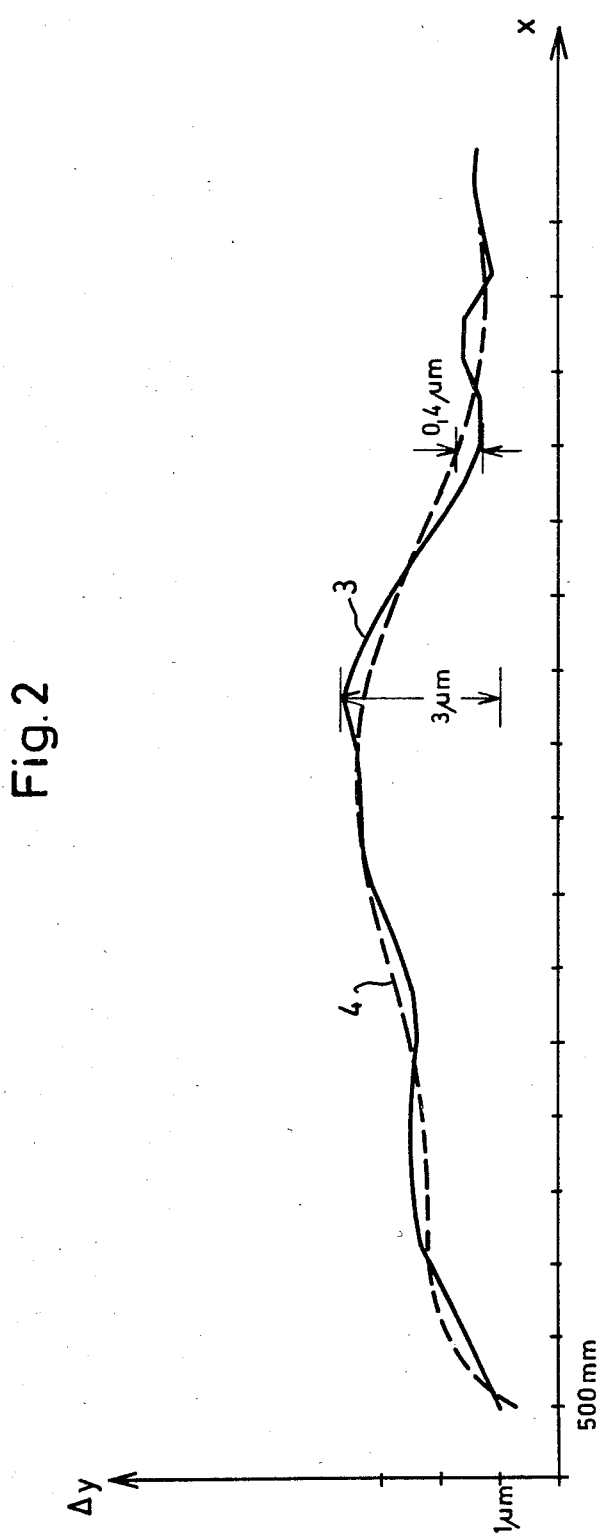
FIG. 2 is a graph to illustratively show the profile of a correction function to compensate for a guidance error, in accordance with the technique of the first method outlined above.

FIG. 2 graphically issustrates a profile of long-period offset $\Delta_y$ of part 2 resulting from non-linearity of the lateral guidance of guide 1, plotted over displacement range in the x-direction. The solid-line curve 3 represents the measured course of the offset, illustratively reaching values up to 3 $\mu$m. The dashed-line curve 4 is an equalizing polynomial of eighth degree which is fitted in the best possible manner to measured error values and which approxiamted the measured values within a band width of $\pm 0.4$ $\mu$m. With this correction function, therefore, an error in the positional determination of the y component (of measurement-probe contact with a work piece) due to defective lateral confinement of the guid path in the x-direction can, in accordance with the first above-mentioned method, be reduced by an order of magnitude by feeding the coefficients of the equalizing polynomial into the memory of a computer and by correctively using them within the measurement program.

FIG. 5 diagramatically shows a carriage 18 with longitudinally spaced bearings 18a–18b, engaging a guide 19. Carriage 18 is displaceable in the x-direction along guide 19 and, due to non-linearity of the guide 19 (shown in exaggerated fashion), is subjected to an off-setting displacement $\Delta_y$ in the y-direction and to angular displacement $D_z$ about an axis z perpendicular to the plane of the drawing. Two additional probes $M_1$ and $M_2$ are mounted to carriage 18 at a distance b apart and are slidable along a reference surface 17 which extends in the x-direction.

By means of the pair of probes $M_1$ and $M_2$, lateral-offset error and rotational error of carriage 18 can be measured simultaneously, the rotational error of carriage position being calculated from the difference in values measured by the two probes, divided by their distance (b) apart, while the lateral-offset error is obtained as the average of the measured values. FIGS. 6a to 6d schematically illustrate indications of $M_1$, $M_2$ measured values for each of the four possible cases, namely:
1. Both measured values are 0, i.e., there is neither offset nor rotation (FIG. 6a);
2. The measured values agree in sign and magnitude, i.e., only lateral offset is present (FIG. 6b);

3. The measured values are of different sign but of the same magnitude, i.e., only rotation is present (FIG. 6c); and
4. The measured values are of different magnitude, i.e., offset and rotation are present (FIG. 6d).

In actual use, practically only the case sketched in FIG. 6d occurs.

Figure 3:
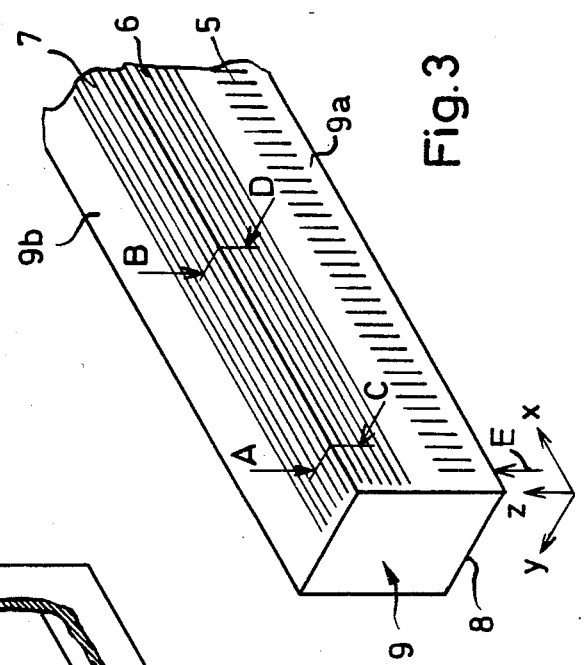
FIGS. 3 and 4 are enlarged fragmentary isometric views respectively showing two relatively movable parts of a length-measuring system, with associated means for detecting guidance errors.

FIG. 3 shows an elongate body 9 which extends in the x-direction of guidance and has scale graduations on three of its longitudinal sides, namely, sides 9a and 9b and a bottom side 8 (concealed, except for the near edges thereof); each of these three sides is characterized by families of longitudinally extending lines (length scales), two (6, 7) of these scales being visible in FIG. 3. With such a standard, all positional errors of a given guidance direction, namely, the aforementioned three rotational error components $D_x$, $D_y$, $D_z$ and the two lateral offsets $\Delta_y$ and $\Delta_z$, can be detected if five reading heads (12 to 16) are placed at the points designated A to D (and E, aligned to face the bottom side 8, in opposition to A) on the body 9.

Figure 4:
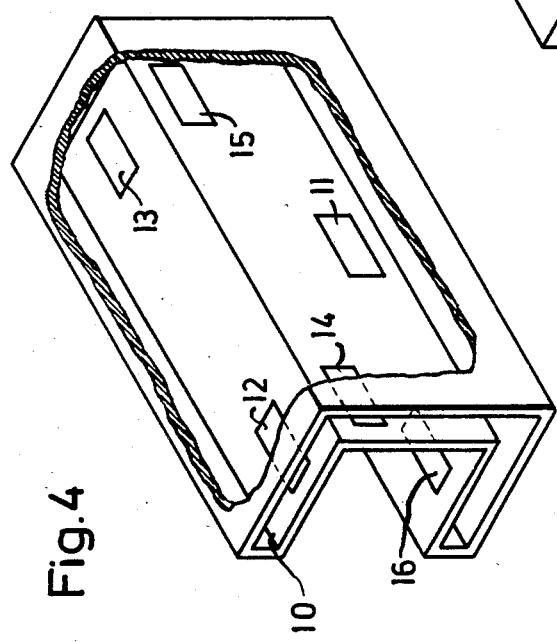

In FIG. 4, these reading heads are seen to be arranged in a guide part 10 in the form of a U-shaped housing, and each reading head will be understood to comprise a photoelectric grid-measurement system of known construction.

With the reading heads thus placed to view top side 9b at longitudinally spaced points A/B, to view lateral side 9a at longitudinally spaced points C/D and to view the top and bottom sides at opposing points A/E, rotational error components of the guide part 10 about the three orthogonal axes, x, y and z can be determined by measuring, as described with reference to FIGS. 5 and 6, differences in the measured values of the reading heads at the points A and E, C and D, and A and B, respectively, and by dividing these differences by their distance apart.

For measurement of the lateral offset $\Delta_y$, the average is taken of the measurement-value outputs of reading heads 12/13 in observation of top surface 9b, and for measurement of the vertical offset $\Delta_z$, the average is taken of the measurement-value outputs of reading heads 14/15 in observation of lateral surface 9a.

In addition, the body 9 is, as indicated by vertical line marks 5 on the lateral surface 9a, provided with a scale against which to measure x-direction displacement of the housing shown in FIG. 4, using a corresponding reading device 11, arranged in the same housing 10. Thus, the same single housing 10 contains a compact measurement system which measures displacement in one coordinate and at the same time determines the magnitude of all guidance errors associated with change of position in said coordinate direction.

Such a measurement systtem is suitable, for instance, for attachment to the guides of a measuring machine or machine tool, thereby considerably improving positional accuracy within the involved machine.

Furthermore, it will be seen that such a measurement system, developed as a mobile unit, can be used for final checking on machines having highly precise guides. This is in contrast to prior practice, wherein guides of measurement machines were tested by means of two different instruments, namely, a laser interferometer for linearity and an autocollimator for tilting.

Figure 7:
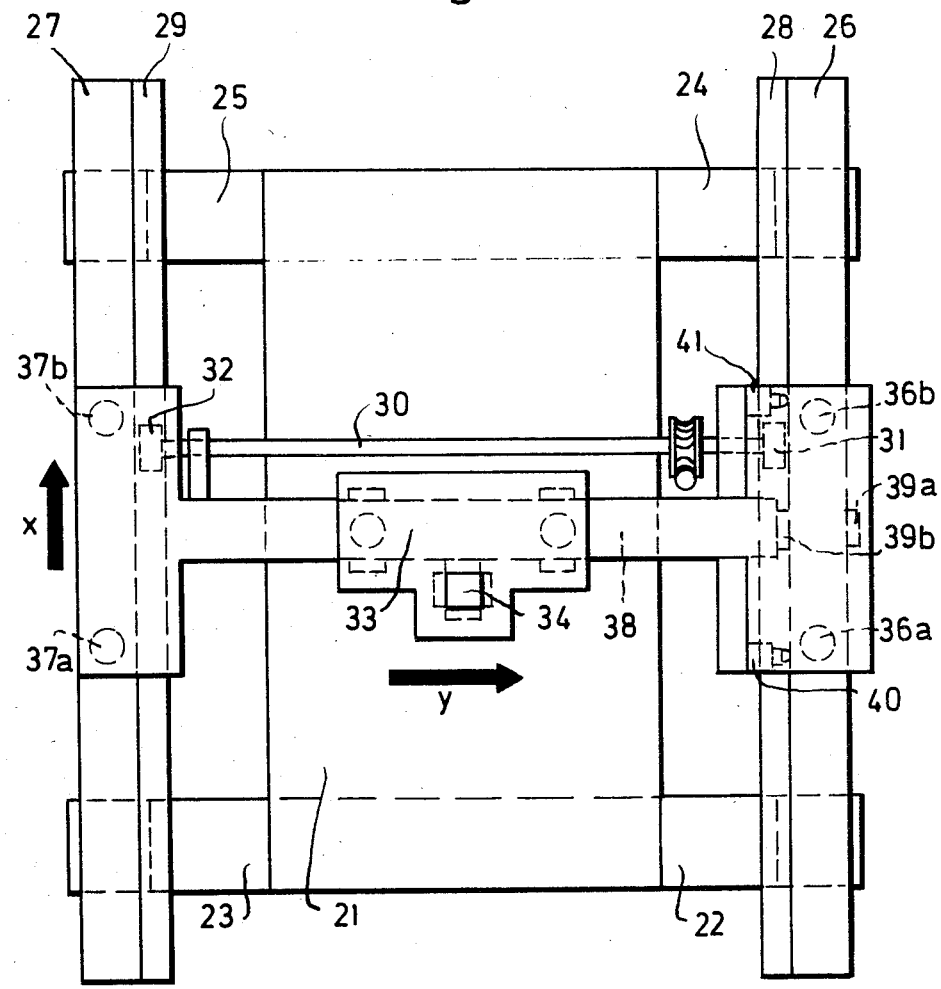
FIG. 7 is a plan view of a bridge-type measuring machine of the invention.
Figure 8:
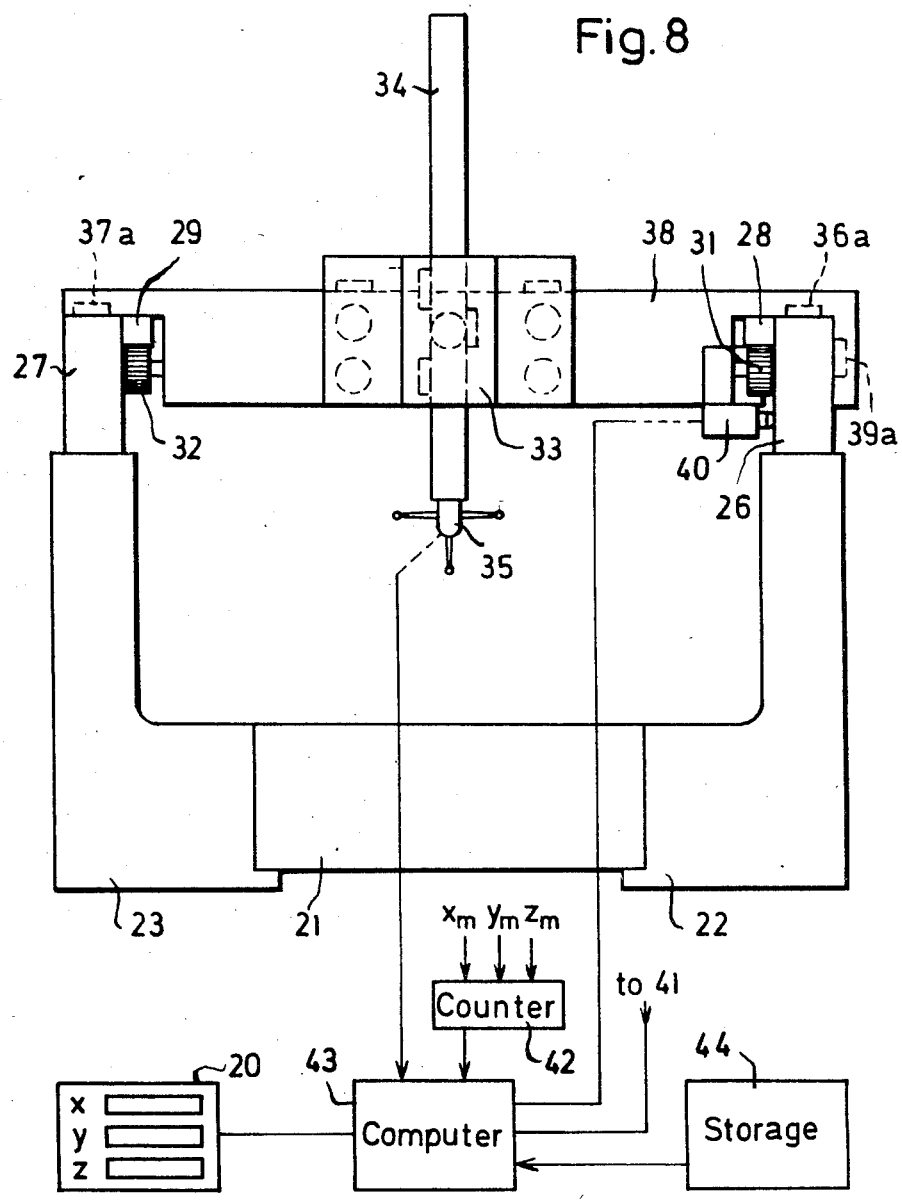
FIG. 8 is a front-elevation view of the bridge-type measurement machine of FIG. 7.

FIGS. 7 and 8 show, as a further example of the invention, a high-speed measuring machine of the bridge type, driven on both sides, and equipped with the measurement system sketched in FIG. 5. The machine has four upstanding support legs 22 to 25 with a table 21 therebetween serving to receive a workpiece. Two parallel guide rails 26 and 27 are mounted by legs 22-24 and 23-25, respectively. A bridge 38 is movable along said rails in the x-direction, being supported on the rails by pairs of air bearings 36a/36b and 37a/37b, and bridge 38 in turn provides the support and guide path for a carriage 33, for movement in the y-direction. A measuring spindle 34, with attached work-contact probe 35, is mounted to carriage 33 and is movable in the vertical or z-axis direction.

Bridge 38 is driven via two pinions 31 and 32 which mesh with racks 28 and 29 fixed to guide rails 26 and 27. A pair of bearings 39a/39b serve to laterally stabilize the x-axis guidance of bridge 38.

The pinion/rack system for positioning bridge 38 in the x-direction is a source of errors in which small angular displacement of the bridge may occur about the vertical; such errors are not sufficiently counteracted by bearings 39a/39b, in view of the small base between these bearings. These angular displacements of bridge 38 effectively involve a hinge action local to the bearing means 39 and therefore they are detectable near the location of bearings 39, thus avoiding any need to make difficult measurements of bridge (38) orientation.

In order to measure angular tilt and lateral offset of the bridge 38, the latter carries two probes 40 and 41 which may be conventional inductive sensors and which are directed at and are slidable along the guide surface for bearing 39b on the inner side of the rail 26. Probes 40-41 are spaced apart in the x-direction, at equal and opposite spacings from the effective hinge axis of bearing means 39, and probes 40-41 will each be understood to produce an electrical output signal responsive to sensed distance to contact with the guide surface for bearing 39b.

Output signals of probes 40 and 41 are fed to the computer 43 (FIG. 8) of the measuring machine, which also processes the measured values $X_m$, $Y_m$, $Z_m$ of the three coordinate measuring devices (not shown) associated with a given point of work contact via the measurement probe 35 of the machine; computer 43 uses the probe signals for correction of the measured value, pursuant to a suitable computer program.

Computer 43 has an associated memory-storage device 44 into which purely long-period deviations in linearity of the inner side of rail 26 are entered in the form of an approximation function (see FIG. 2).

In the work-contacting probe process, coordinate values $X_m$, $Y_m$, $Z_m$ measured at the time of each point of contact with the workpiece are transferred into computer 43 via a pulse derived from probe head 35, $X_m$, $Y_m$ and $Z_m$ values having been generated in counter 42, by adding incremental signals of known X, Y and Z carriage-position-measurement systems. In the evaluation program, the measured values $X_m$ and $Y_m$ are corrected to the extent of the values measured by the additional probes 40 and 41, as described in reference to FIG. 5; and this correction preferably occurs after the most-recently measured work-contact values have in their turn been modified by means of the approximation function stored at 44.

The result of the measurement, which has been corrected twice in this way, is then made visible at a display unit 20.

What is claimed is:

1. In a measuring machine (i) wherein a rectilinear guide establishes a path of longitudinal guidance in the course of displacement of a movable part with respect to a fixed part of a given plane, (ii) wherein said parts longitudinally overlap for a predetermined fraction of the maximum extent of longitudinal guidance, and (iii) wherein means including an incremental scale and a scale-reading device measure displacement along said path, a longitudinally extending scale and two scale-reading transducers for determining deviations from a desired straight path of displacement, said scale being a fixed feature of said fixed part and comprising a plurality of uniformly and closely spaced parallel longitudinally extending lines which are strictly parallel to each other and which establish a basis of parallel reference to the desired straight-line path over the longitudinal extent of said path, the lines of said scale being parallel to said given plane and extending the length of said path, said transducers being carried at predetermined longitudinal spacing near the repective longitudinal ends of said movable part and effectively spanning the extent of said overlap, each of said transducers producing a change in transverse measurement in response to any traversing incremental scan displacement with respect to one or more of the lines of said scale; whereby, in the course of guided displacement of said movable part, the instantaneous difference between the repective transverse measurements generated by the respective transducers is a measure of instantaneous yaw-angle deviation of said parts with respect to each other, and whereby the instantaneous average of said respective transverse measurements is a measure of instantaneous transverse offset of said movable part from said desired straight-line path.

2. The measuring machine of claim 1, in which the parallel lines of said scale extend for the full longitudinal extent of said path plus the extent of said overlap, whereby both transducers are operative to respond to scale-line traverse, whatever the position of said movable part along said path.

3. The measuring machine of claim 1, in which said incremental scale is a fixed feature of said fixed part and comprises a second set of plural uniformly and closely spaced parallel lines which are perpendicular to and establish a basis of positional reference along the desired straight-line path, and in which said scale-reading device is a positional-reference measuring transducer carried by said movable part in facing relation to the second set of lines of said scale.

4. The measuring machine of claim 3, in which said first-mentioned and second-mentioned pluralities of scale lines are in side-by-side relation on a single flat surface.

5. In a measuring machine (i) wherein a rectilinear guide establishes a path of longitudinal guidance in the course of displacement of a movable part with respect to a fixed part in a given plane, (ii) wherein said parts longitudinally overlap for a predetermined fraction of the maximum extent of longitudinal guidance, and (iii) wherein means including an incremental scale and a scale-reading device measure displacement along said path, a straight-line reference and two longitudinally spaced transducers for determining deviations from a desired straight path of displacement, said straight-line reference being a fixed feature of said fixed part and extending over the longitudinal extent of said path, said transducers being oriented transverse to said straight-line reference for measuring response to instantaneous offset from said reference in a plane parallel to said given plane, said transducers being carried at predetermined longitudinal spacing near the respective longitudinal ends of said movable part and effectively spanning the extent of said overlap, each of said transducers producing a digital output for measurement of offset with respect to said straight-line reference; whereby in the course of guided displacement of said movable part, the digital difference between instantaneous offset measurements generated by the respective transducers is a measure of yaw-angle deviation of said parts with respect to each other, and whereby the instantaneous digital average of said offset measurements is a measure of true lateral transverse offset of said movable part from said desired straight-line path.

6. The measuring machine of claim 5, in which said straight-line reference is established by an elongate flat surface oriented normal to said given plane and facing said transducers.

7. In combination, a measuring reference comprising an elongate rigid body having a straight flat scale surface with a first plurality of uniformly and closely spaced parallel lines which extend for the longitudinal extent of said body and a second set of plural uniformly and closely spaced parallel lines which are transversely offset from said first plurality and which are oriented transverse to the elongate dimension of said body, a longitudinally guided deviation-tracking device spanning a predetermined fraction of the length of said rigid body, a first two scale-reading transducers carried by said device at longitudinal spacing and facing said first plurality of lines, the longitudinal extent of said parallel lines exceeding the longitudinal spacing of said transducers, each of said transducers producing a digital response to any traversing incremental scan displacement with respect to one or more of the lines of said first plurality, and a third transducer facing lines of said second set and producing a digital response to any traverse of the lines of said second set.

8. In combination, a measuring reference comprising an elongate rigid body having a straight flat scale surface with a plurality of uniformly and closely spaced parallel lines which extend from the longitudinal extent of said body, a longitudinally guided deviation-tracking device spanning a predetermined fraction of the length of said rigid body, and two-scale reading transducers carried by said device at longitudinal spacing and facing said first plurality of lines, each of said transducers producing a digital response to any traversing incremental scan displacement with respect to one or more of the lines of said first plurality.

9. A measuring reference comprising an elongate rigid body of rectangular cross-section with first, second and third scales respectively on first, second and third elongate surfaces of said body, each of said scales comprising a plurality of uniformly and closely spaced parallel lines which extend for the longitudinal extent of said body.

10. The measuring reference of claim 9, in which a fourth scale is carried on one of the surfaces of said body, said fourth scale comprising a set of plural uniformly and closely spaced parallel lines which are at offset from any of said first three scales and which are oriented transverse to the elongate dimension of said body.

11. In combination with the measuring reference of claim 9, a longitudinally guided deviation-tracking device spanning a predetermined fraction of the length of said rigid body, a first two scale-reading transducers carried by said device at longitudinal spacing and facing a first of said scales, a second pair of scale-reading transducers carried by said device at longitudinal spacing and facing a second of said scales on a surface adjacent the surface of said first scale, and a fifth scale-reading transducer carried by said device and facing the remaining one of said scales at a longitudinal location which corresponds to the longitudinal location of one of the two transducers which is poised for scale-reading on the surface opposite the scale surface read by said fifth transducer.

12. In a measuring machine wherein a rectilinear guide establishes a path of longitudinal guidance in the course of displacement of a movable part with respect to a fixed part in a given plane, and wherein said parts longitudinally overlap for a predetermined fraction of the maximum extent of longitudinal guidance, and wherein incremental distance is measured for displacement along said path, the method of using two longitudinally spaced transducers on said movable part to determine and correct errors in lognitudinal guidance which comprises:
  (a) establishing a fixed line of parallel reference to the path of longitudinal guidance, said fixed line extending the length of said path;
  (b) directing said transducers to respond individually and digitally to incremental changes in transverse offset with respect to said fixed line in the course of a guided displacement of said movable part;
  (c) taking the difference between digital outputs of said transducers to obtain an instantaneous measure of yaw-angle deviation of said parts with respect to each other; and
  (d) taking the digital average of said digital outputs of said transducers to obtain an instantaneous measure of lateral transverse offset of said movable part from said desired straight-line path.

13. The method of claim 12, wherein said fixed line of reference is one of a plurality of uniformly spaced parallel lines in a plane parallel to said given plane, and the directing of said transducers is such as to observe and count traversal of one or more of said parallel lines at each of the respective spaced locations of said transducers.

14. The method of claim 12, wherein said fixed line of reference is an elongate flat surface perpendicular to said given plane, and the directing of said transducers is such as to observe incremental changes in lateral offset distance from said flat surface at each of the respective spaced locations of said transducers.

15. The method of claim 12, together with the further steps of: (e) entering into computer storage the difference values and the average values resulting from steps (c) and (d) as a function of movable-partdisplacement over the length of said guide; and (f) using the computer-stored values for correction of subsequent measurements by the machine.

* * * * *